United States Patent [19]

Trakas

[11] Patent Number: 4,906,360
[45] Date of Patent: Mar. 6, 1990

[54] MULTI-STAGE INJECTION MOLDING FILTER

[76] Inventor: Panos Trakas, 21 West Wrightwood, Glendale Heights, Ill. 60139

[21] Appl. No.: 316,995

[22] Filed: Feb. 28, 1989

[51] Int. Cl.⁴ .............................................. B01D 27/00
[52] U.S. Cl. .................................. 210/184; 210/437; 210/447; 210/456; 425/84; 425/197
[58] Field of Search ............... 210/184, 435, 437, 441, 210/446, 447, 451, 455, 456, 459, 461, 463, 497.01; 249/78; 264/169; 425/72.1, 84, 114, 197, 198, 199

[56] References Cited

U.S. PATENT DOCUMENTS

| | | | |
|---|---|---|---|
| 1,335,899 | 4/1920 | Kahlenberg | 210/446 |
| 1,802,423 | 4/1931 | Hemmingsen | 210/497.01 |
| 2,304,492 | 12/1942 | Aue et al. | 210/134 |
| 2,895,167 | 7/1959 | Paggi | 425/197 |
| 3,767,056 | 10/1973 | Neuman | 210/409 |
| 3,825,123 | 7/1974 | Neuman | 210/232 |
| 4,054,273 | 10/1977 | Neuman | 366/69 |
| 4,097,216 | 6/1978 | Putkowski | 425/568 |
| 4,252,759 | 2/1981 | Yannas et al. | 425/84 |
| 4,256,584 | 3/1981 | Lord et al. | 210/446 |
| 4,280,098 | 7/1981 | Lord et al. | 210/446 |
| 4,373,895 | 2/1983 | Yamamoto et al. | 425/461 |
| 4,434,053 | 2/1984 | Osuna-Diaz | 210/446 |
| 4,627,916 | 12/1986 | Dörsam | 425/197 |

OTHER PUBLICATIONS

"Filter Nozzle" *Mold Masters Brochure*, (1982).
"Removable Tipe Adapters, Solid Nozzles and Heater Bands", *Erico Plastics Equipment*, (1980), pp. 22–23.
"Filter Cartridge", *Hasco*, (1978).
"EMI Corp. Plastics Equipment Advertisement", *PlasticTrends*, Feb.–Mar., 1988, p. 3.

*Primary Examiner*—Richard V. Fisher
*Assistant Examiner*—Wanda L. Millard
*Attorney, Agent, or Firm*—Lockwood, Alex, FitzGibbon & Cummings

[57] ABSTRACT

A multi-stage filter for filtering injection molding melt includes an elongate filter element having a filter inlet end, a filter outlet end and a plurality of filter stages axially disposed on the element and adjoining each other. Each filter stage includes a plurality of axial filter grooves in its outer surface which are spaced apart from a filter chamber wall to define a distinct filter clearance for each filter stage. The axial filter grooves are circumferentially spaced apart from each other and alternate with axial grooves axially extending between adjoining filter stages which define melt transfer passages to transfer melt between filter stages.

21 Claims, 2 Drawing Sheets

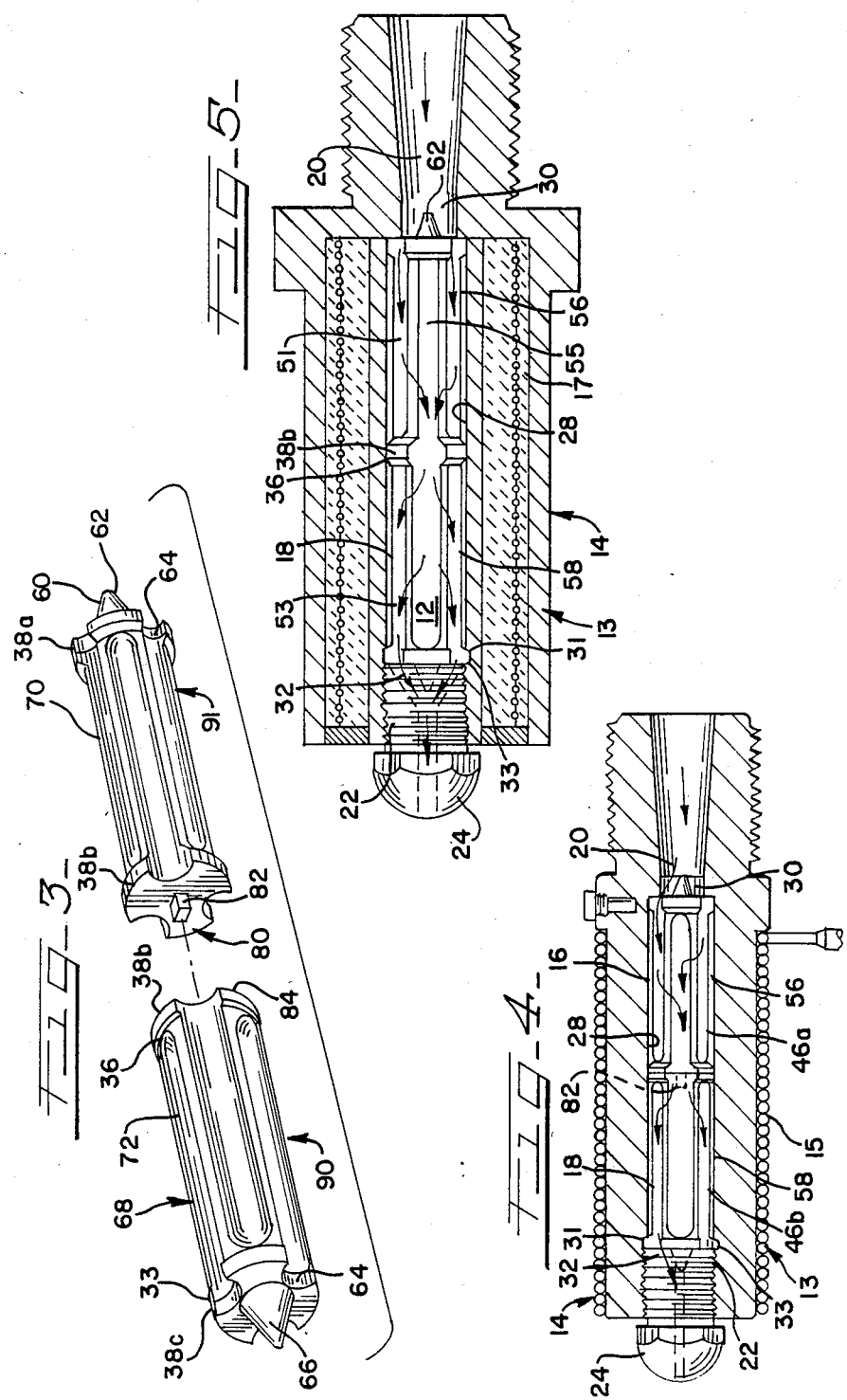

MULTI-STAGE INJECTION MOLDING FILTER

BACKGROUND AND SUMMARY OF THE INVENTION

The present invention relates generally to filters for injection molding machines and more particularly, to multi-stage axial flow filters for removing contaminants and particles from the melt prior to the injection of the melt into the mold.

It is desirable to provide injection molding machines with a means for filtering the melt and removing any contaminants from the melt prior to it passing through the injection molding machine nozzle into the mold. These contaminants are typically unmelted plastic granules, but can also include other materials such a metal bits and dirt which may become lodged in the mold cavities and interfere with the complete fill by the melt of the mold cavity.

One presently available filter is described in U.S. Pat. No. 4,434,053 and uses a cylindrical filter member which has a series of circumferentially-spaced axial grooves in its outer surface, which grooves include a series of fine radial holes radially extending from the grooves and communicating with an interior annular filter passage. Such a construction presents problems in that the radial holes can be easily clogged with contaminants and the melt will tend to accumulate in the radial holes upon cooling. When the melt has cooled, such a filter must be tediously cleaned with a pin or by the application of heat to open the holes. Additionally, the use of such small holes for filtration purposes increases the need to periodically remove the injection nozzle for filter cleaning purposes.

In a multi-stage injection molding filter incorporating the principles of the present invention, an elongate member includes a plurality of filter stages defined by sets of lands each having a different diameter which define a series of separate, axially aligned filter passages between the filter chamber inner wall and the filter member. A plurality of axial grooves are disposed in the filter member outer surface and are circumferentially spaced apart from each other. These grooves define melt inlet and outlet flow passages in the filter member. Additional axial grooves lie between and are disposed adjacent the inlet and outlet flow passages to define transfer passages which convey the melt from the first filter stage to the next filter stage.

Accordingly, it is a general object of the present invention to provide a new and improved axial flow multi-stage filter for injection molding.

It is another object of the present invention to provide an axial flow, multi-stage filter for use in injection molding machines which can be easily removed from the molding machine and cleaned.

It is another object of the present invention to provide an injection molding multi-stage axial flow filter having a first and second series of axial grooves which define respective inlet and outlet melt passages within the respective first and second filter stages and a third series of axial grooves peripherally spaced apart from the first and second axial grooves to define melt transfer passages extending between the first and second filter stages and communicating therewith.

It is yet a further object of the present invention to provide a cylindrical filter member having axially aligned multiple filter stages for use in an injection molding nozzle wherein each filter stage has a preselected filter clearance between the filter stag and the injection nozzle inner surface, and wherein the preselected filter clearance diminishes from a first filter stage filter clearance to a last filter stage filter clearance.

These and other objects, features and advantages of the present invention will be clearly understood through a consideration of the following detailed description taken in conjunction with the following drawings wherein like reference numerals indicate like parts.

BRIEF DESCRIPTION OF THE DRAWINGS

FIG. 3 is an exploded perspective view of a multistage axial flow filter constructed in accordance with the principles of the present invention;

FIG. 4 is a sectional view of the filter of FIG. 1 in place within an externally heated injection molding nozzle, and FIG. 5 is a sectional view of the filter of FIG. 3 in place within an internally heated injection molding nozzle.

DETAILED DESCRIPTION OF THE INVENTION

Figure 1:
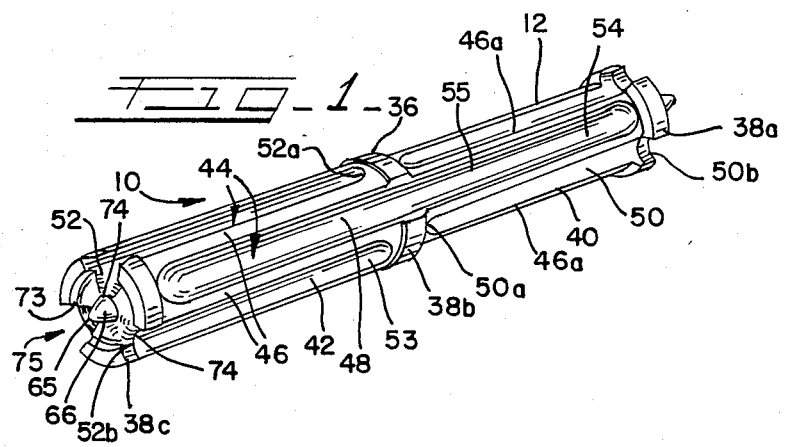
FIG. 1 is perspective view of a two-stage axial flow filter constructed in accordance with the principles of the present invention.

A filter element 10 constructed in accordance with one embodiment of the present invention is shown in FIG. 1 and includes a generally cylindrical elongate filter member 12. Although shown in the drawings as cylindrical, it is understood that any other suitable configuration of the filter member which permits adequate flow can be used in the present invention. As shown in FIGS. 4 and 5 filter member 12 is received in a body 13 of an injection molding machine nozzle 14, which has an internal bore 16 extending therethrough which defines a filter chamber 18 which receives the filter member 12. The nozzle body has an inlet end 20 into which the molding material is introduced and an opposite outlet end 22 through which the melt passes to enter into the mold. The nozzle body outlet may be threaded at its front to receive a variety of nozzle tips 24, and the nozzle body may be heated either by an external band heater 15 (FIG. 4) or by an internal heating element 17.

The filter chamber 18 of body 13 has a generally cylindrical inner wall 28 and inlet and outlet openings 30 and 32, respectively at opposite ends of the filter chamber 18. Outlet opening 32 may include a shoulder 31 which abuts against a filter element rim 33 on the filter outlet end when the filter member 12 is fully inserted in the filter chamber 28. This rim 33 positions the filter 10 within the filter chamber 18, and prevents the filter from being inserted backwards in the filter chamber.

Figure 2:
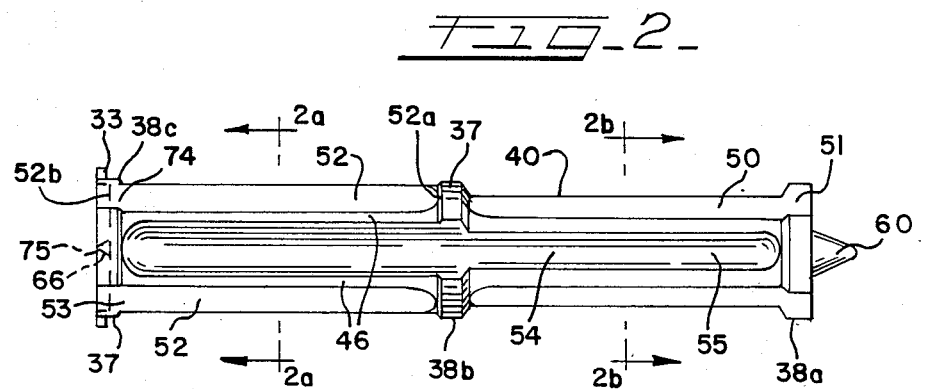
FIG. 2 is a side elevation of the two-stage filter of FIG. 1.
Figure 2A:
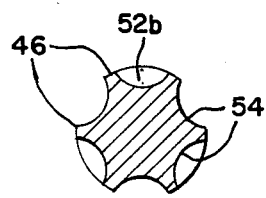
FIG. 2a is a sectional view taken along line 2a—2a of FIG. 2.
Figure 2B:
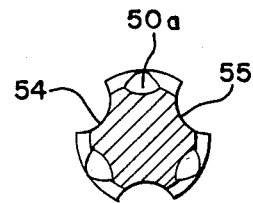
FIG. 2b is a sectional view taken along line 2b—2b of FIG. 2.

As shown in FIGS. 1-2, the filter member 12 has an outer surface 36 which is disposed in close proximity to the filter chamber inner wall 28. The filter member outer surface 36 abuts the inner chamber wall 28 at filter stage separation means 37 which include three interrupted circumferential ridges 38a, 38b, 38c separating the various filter stages and disposed at the ends of the filter axial grooves. These ridges 38a, b & c not only align the filter in its proper filter clearance within the filter chamber 18 but also serve as barriers which close off the axial grooves and consequently direct melt flowing therein across the filter member lands 46.

A unitary two-stage axial filter 48 is shown in FIGS. 1 and 2 as having a first filter stage 40 disposed proximate to the body inlet end 20 and a second filter stage 42 disposed proximate to the body outlet end 22. The first filter stage 40 axially adjoins the last filter stage 42. The filter member 12 includes a series of axial grooves, generally 44, which are circumferentially spaced about the filter element outer surface 36. The axial grooves 44 are separated by a series of intervening raised portions or lands 46. A series of first axial grooves 50 is disposed on the filter first stage 40. These grooves 50 define a plurality of first melt flow passages 51 which are separated by lands 46a and which extend for substantially the entire length of the filter first stage 40. These first flow passages 51 have blind ends 50a at their innermost extent on the filter first stage 40 adjacent the filter member ridges 38 and further include opposite open ends 50b which open into the chamber inlet opening 30. The second filter stage 42 has a series of second axial grooves 52 which are separated by lands 46b and which extend for substantially the entire length of second filter stage 42 and which define a plurality of second melt flow passages 53. Similar to the first melt flow passages 51, the second melt flow passages 53 have blind ends 52a at their innermost extent on filter member 12 and opposite open ends 52b which open into the filter chamber outlet opening 32.

The blind ends 50a of the first axial grooves 50 terminate proximate to the end of the first filter stage 40 on one side of the separation ridge 38b, and the blind ends 52a of second axial grooves terminate proximate to the end of the filter second stage 42 on the other side of the center ridge 38b. As shown in the drawings, the first and second axial grooves are axially aligned with each other on filter member 12.

The filter member 12 includes a third series of axial grooves 54 which is disposed intermediate the first and second grooves 50 and 52. These third axial grooves 54 are peripherally spaced apart from the first and second axial grooves 50 and 52 and are separated therefrom by a plurality of intervening and differently sized lands 46 on each separate filter stage 40 and 42. Each of third grooves 54 has two opposing blind ends 54a and 54b which terminate proximate to the end ridges 38a, 38c of the first and last filter stages. Third axial grooves 54 define a plurality of melt flow transfer passages 55 which extend substantially for the entire length of the filter member 12 pass through the center ridge 38b, and extend equally into the first and last filter stages 40 and 42. As such, the third axial grooves 54 serve to transfer filtered melt from the filter first stage 40 to the filter second stage 42 where it is filtered again prior to passing through the filter outlet and exiting from the nozzle.

The intervening lands 46 are relieved in their radial extent between the filter separation ridges 38 to provide a preselected distance or filter clearance between the lands 46 and the filter chamber wall 28. The first filter clearance between the first filter stage lands 46a and the body chamber wall 28 is greater than the second filter clearance between the second filter stage lands 46b and the body chamber wall 28. These filter clearances define first and second filtering passages 56 and 58, respectively, for the first and second filter stages.

In operation, the melt flows from the injection machine body into the filter chamber inlet opening 30 and enters the first axial grooves 50. The first axial groove blind ends 50a and the separation ridges 38b combine with the injection pressure to force the melt from the first axial grooves 50 over the intervening first filter stage lands 46a through the first filter clearance 56 into the third axial or transfer grooves 54. The first filter clearance catches and prevents unmelted particles and other contaminants which are greater in size than the first stage filter clearance 56 from passing into the third axial or transfer grooves 54.

Subsequently, the first filtered melt flows in transfer groove 54 and enters the second filter stage 42 where it is forced by the injection pressure over the intervening second stage lands 46b into the second or last series of axial grooves 52. Any contaminants or particles smaller than the first filter clearance 56 but greater than the last filter clearance 58 are caught in the transfer groove 54. The second filtered melt is then forced by injection pressure out of second grooves 52 into the outlet chamber opening 32 and exits the nozzle. The arrows in FIGS. 4–5 illustrate the path that the melt takes entering the filter element by way of first grooves 50, passing over the first filter lands 46a into the transfer grooves 54 and over the last filter lands 46b into the second grooves 52.

The filter clearances can be chosen by the operator to trap the particle size most commonly encountered in his molding operation. Filter clearances as large as 0.094 inches have been found to trap large particles effectively, while filter clearances as low as 0.015 inches have been found effective in trapping small particles. It has been found that a first filter stage clearance of 0.06 inches and a second filter stage clearance, distinct from the first, of 0.02 inches is preferable and yields a suitable pressure drop through the filter assembly while, at the same time provides the desired particulate removal from the melt.

In order to evenly distribute the melt into the first axial grooves 50, the filter element 10 may be provided with an axially extending tapered end portion 60 in the form of a cone 62 centrally disposed on the filter inlet end. The first flow passage open ends 50b may include ramps 64 or channels 65 which connect the inlet cone 60 with first axial inlet grooves 50. A similar cone 66 may be present at the outlet end of the filter member 12 to direct the filtered melt toward the center of the chamber outlet 32, and alternatively, the outlet end of the filter member may be provided with an axial recess 73 into which the filter second axial grooves 52 open via ramps or channels 74 (FIG. 1). This axial recess 73 in cooperation with the filter chamber inner wall 28 and the nozzle tip 24 defines a mixing chamber 75 for the filtered melt to mix in prior to exiting the filter outlet 32.

FIG. 3 shows an alternate embodiment of a multistage filter 68 constructed in accordance with the principles of the present invention and having two separate and independent sections 90 and 91 which form the respective first and second filter stages 70 and 72. Similar to that described above, the filter 68 has first filter stage 70 disposed at the nozzle inlet end, and a second filter stage 72 disposed at the nozzle outlet end. The two filter stages are axially aligned with each other and axially adjoin each other in the filter chamber. To ensure proper alignment of the adjoining filter stages and to prevent the relative rotation of adjoining filter stages the ends of the filter stages include engagement means 80 in the form of a projecting key 82 which is received in a corresponding slot (not shown) on the mating face 84 of the adjoining filter stage. These keys interlock the various filter stages together and allow them to be detachably connected.

It will be appreciated that the embodiments of the present invention that have been discussed herein are merely illustrative of a few applications of the principles of the invention. Numerous modifications may be made by those skilled in the art without departing from the true spirit and scope of the invention.

I claim:

1. A nozzle-filter assembly for use in an injection molding machine to axially filter melt passing therethrough, comprising:

a nozzle body having an internal bore formed therein defining a filter chamber having a melt flow inlet portion and a melt flow outlet portion;

an elongate filter element removably disposed within said filter chamber, said filter element including a filter body member having an inlet end and an outlet end, the filter body member having an outer surface disposed proximate to the inner surface of the nozzle filter chamber and at least first and second filter stages disposed in axially adjoining relationship, the outer surface of the first filter stage having a series of first axial grooves therein which define a plurality of first melt flow passages extending from the filter chamber inlet into said filter first stage, the outer surface of the second filter stage having a series of second axial grooves therein defining a plurality of second melt flow passages extending from said second filter stage to the filter chamber outlet, the outer surface of the filter member also having a series of third axial grooves therein defining a plurality of melt transfer passages extending into and between said filter first and second stages, said third axial grooves being peripherally spaced apart from each other and spaced apart from said first and second axial grooves, said filter member including a plurality of longitudinally extending lands separating the third axial grooves from said first and second axial grooves in each of said first and second filter stages, said lands in said first filter stage being spaced a first preselected distance from the inner surface of said filter chamber to define a first filter clearance in said first filter stage, said lands in said second filter stage being spaced a second preselected distance from the inner surface of said filter chamber to define a second filter clearance in said second filter stage, whereby said first and second filter clearances define first and second filter melt flowpaths between adjacent axial grooves which trap contaminants present in the melt and prevent said contaminants from passing from said filter chamber melt flow inlet to said filter chamber melt flow outlet.

2. The nozzle-filter assembly of claim 1, wherein said nozzle body further includes an internal heater.

3. The nozzle-filter assembly of claim 1, wherein said nozzle body further includes an external heater.

4. The nozzle-filter assembly of claim 1 wherein said elongate filter element includes first and second separate sections which respectively form said first and second filter stages further include engagement means for detachably connecting said first and second separate sections to each other to prevent rotation of said first and second filter stages relative to each other and to ensure alignment of said third axial grooves in on said first and second filter stages.

5. The nozzle-filter assembly of claim 1, wherein said filter body member includes a tapered end portion at the inlet end and outlet end of said filter member.

6. The nozzle-filter assembly of claim 1, wherein the first preselected distance between said first filter stage lands and said filter chamber inner surface is greater than the second preselected distance between said second filter stage lands and said filter chamber inner surface.

7. The nozzle-filter assembly of claim 1, wherein said first filter clearance is approximately 0.060 inches and said second filter clearance is approximately 0.020 inches.

8. The nozzle-filter assembly of claim 1, wherein said first and second filter clearances ar distinct clearances and are chosen from the range of between approximately 0.094 inches to approximately 0.015 inches.

9. The nozzle-filter assembly of claim 1, wherein said third axial grooves extend substantially the entire length of said filter member and provide a melt transfer passage between said first and second filter stages.

10. The nozzle-filter assembly of claim 1, wherein said filter body member includes filter stage separation and melt flow directing means having ridges separating said first and second filter stages, said ridges contacting the inner wall of said filter chamber said edges further including barriers disposed in said first and second axial grooves which direct the melt across filter member lands and through said filter clearances.

11. The nozzle-filter assembly of claim 1, further including an axial recess at one end of said filter member, one of said series of first and second axial groove opening into the axial recess, said axial recess cooperating with said filter chamber to define a mixing chamber for melt.

12. The nozzle-filter assembly of claim 1, wherein said nozzle body includes an external band heater in overlying relationship therewith.

13. The nozzle-filter assembly of claim 1, wherein said nozzle body includes an exterior casing, an internal core interposed between the interior of said casing and the outer surface of said nozzle body, and at least one heating element in said internal core.

14. The nozzle-filter assembly of claim 1, wherein said filter body member is generally cylindrical and said nozzle body internal bore is generally cylindrical.

15. An injection molding multi-stage filter for use in an injection molding nozzle having a bore which dispenses the injection melt axially therethrough said filter comprising an elongate filter element having a plurality of separate filter stages disposed thereon in axial adjoining relationship, the outer surfaces of said filter stages being closely spaced to the bore such that a plurality of filter clearances are defined for each filter stage between each of said filter stages and said nozzle bore, the first filter stage having a plurality of first axial grooves disposed therein defining a plurality of first filter flow passages, the second filter stage having a plurality of second axial grooves disposed therein defining a plurality of second filter flow passages, said first and second axial grooves being axially aligned on said filter element, said filter element further including a series of third axial grooves circumferentially spaced apart from said first and second axial grooves, said third axial grooves defining a plurality of melt transfer passages extending between adjoining filter stages, said third axial grooves being separated from said first and second axial grooves by a plurality of lands, the first filter stage lands being spaced a preselected distance away from said nozzle bore to define a first filter clearance, the second filter stage lands being spaced a preselected distance away from said nozzle bore to define a second filter clearance.

16. The multi-stage filter of claim 15, wherein said first filter clearance is approximately 0.060 inches and said second filter clearance is approximately 0.020 inches.

17. The multi-stage filter of claim 15, wherein said filter element first and second stages are held together in axial alignment by interlocking engagement means.

18. The multi-stage filter of claim 15, wherein said filter first stage includes a filter inlet end having a tapered inlet portion axially extending therefrom and said filter second stage includes a filter outlet end having a tapered outlet portion axially extending therefrom.

19. The multi-stage filter of claim 15, wherein said first and second filter clearances are chosen from the range of filter clearances of approximately 0.094 inches to approximately 0.015 inches.

20. The multi-stage filter of claim 15, wherein said filter element includes filter stage separation and melt direction means which include a plurality of ridges outwardly extending from said filter element and into contact with said cylindrical bore, said ridges being circumferentially disposed on said filter element and separating said first and second axial grooves, said ridges further including melt barriers which direct the melt over said filter element lands and into circumferentially adjacent filter element passages.

21. The multi-stage filter of claim 15, wherein said elongate filter member is generally cylindrical.

* * * * *